M. G. HUBBARD.
Fifth Wheel.
No. 13,311.
Patented July 24, 1855.
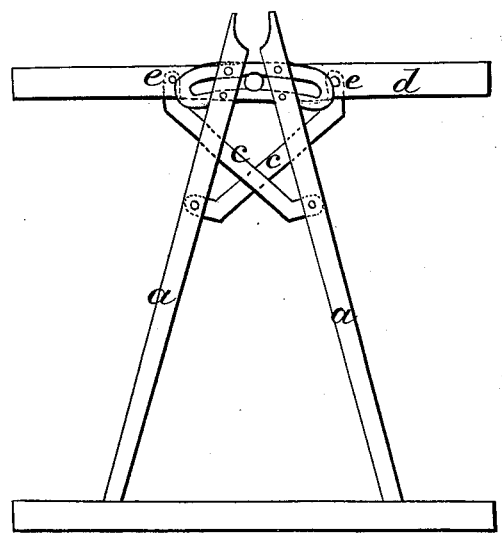

UNITED STATES PATENT OFFICE.

MOSES G. HUBBARD, OF NEW YORK, N. Y.

CARRIAGE.

Specification of Letters Patent No. 13,311, dated July 24, 1855.

*To all whom it may concern:*

Be it known that I, M. G. HUBBARD, of the city, county, and State of New York, have invented certain new and useful improvements in connecting the forward wheels of a carriage with the other parts of the running-gear for the purpose of turning short and steadying the carriage more perfectly than can be done by the modes heretofore devised; and I do hereby declare the following to be a full, clear, and exact description thereof, reference being had to the accompanying drawing, which is a plan of the device.

The object of my improvement is to furnish a connection between the forward axle and other running gear of a carriage or road vehicle of any kind that shall enable the carriage to turn short while at the same time the draft is steadier and more easy than the devices for this purpose heretofore essayed and the carriage can be backed without turning out of position as in other short turning gear where the forward axle is connected far back.

My improvement is constructed as follows: I form the running gear with springs as in the patents heretofore granted to me the two springs which are attached to the body behind and to the bolster in front lettered *a a* in the drawing have an iron either curved or straight connecting and affixed to their front end. This iron is lettered *b* and has a long slot in it wide enough to allow the king bolt to pass through and freely play from end to end of said slot as the axle turns; to either side behind the point where plate *b* is attached to the springs *a a*, a sufficient distance for the purpose intended, I affix by a proper joint to each of said springs a rod or bar *c* which bars cross each other, extending forward to the axle *d*, where they are jointed, as clearly shown in the drawing, to said axle at the points *e e;* the rod connected with the right hand spring being crossed over and jointed to the axle on the left hand side and vice versa.

By the above arrangement the king bolt or center of the axle in turning from side to side can be made to traverse in a straight line or a curved one according to the relative position of the fulcrums or joints of the bars *c c*. It will be seen that this arrangement gives greater stability to the vehicle than where the coupling is in the center line of the carriage, while at the same time it allows the turn to be made easier.

It is a device peculiarly adapted to the construction and arrangement of the springs of my patented spring wagon or buggy.

Having thus fully described my improved running gear what I claim therein as new is—

The cross bars for attaching the forward axle to the other parts of the running gear and the bar for the king bolt combined and arranged substantially in the manner and for the purpose set forth.

M. G. HUBBARD.

Witnesses:
   J. J. GREENOUGH,
   JACOB HATZEL, Jr.